(12) United States Patent
Kostrun

(10) Patent No.: US 6,378,622 B1
(45) Date of Patent: Apr. 30, 2002

(54) SOIL LABORING TOOL

(75) Inventor: Bruno Romeo Kostrun, Monte Maiz (AR)

(73) Assignee: Ingersoll Argentina S.A. (AR)

( * ) Notice: Subject to any disclaimer, the term of this patent is extended or adjusted under 35 U.S.C. 154(b) by 0 days.

(21) Appl. No.: 09/578,276

(22) Filed: May 25, 2000

(30) Foreign Application Priority Data

Oct. 4, 1999 (AR) .................................. M 99 01 05030

(51) Int. Cl.[7] .............................................. F16C 13/00
(52) U.S. Cl. ........................ 172/604; 172/753; 384/157
(58) Field of Search ................................ 172/604, 753, 172/762, 772, 776; 384/91, 129, 157

(56) References Cited

U.S. PATENT DOCUMENTS 5,517,932 A * 5/1996 Ott et al. .................... 111/193
5,874,791 A * 2/1999 Park ............................. 310/42
6,257,767 B1 * 7/2001 Borcherding et al. ....... 384/209

* cited by examiner

Primary Examiner—Christopher J. Novosad
(74) Attorney, Agent, or Firm—Norris, McLaughlin & Marcus

(57) ABSTRACT

A tool for agricultural labors such as tilling, cultivating, cutting, chopping haulm and soil, fertilizing works, closing and opening furrows, the tool comprising a disc member having a center portion thereof shaped into a housing integrally forming one piece with the disc member, the housing having an inner wall for tightly receiving a bearing, the housing comprising a tubular portion formed in the disc member by stamping or by forging.

18 Claims, 4 Drawing Sheets

SOIL LABORING TOOL

BACKGROUND OF THE INVENTION

1. Field of the Invention

The present invention relates to a tool for working or laboring soil, preferably for agricultural labors such as tilling, cultivating, cutting and chopping haulm and stubble, planting, closing furrows, opening furrows, fertilizing and any other similar work, and more particularly the invention refers to a tool such as a plowing implement, disc, chopping disc, colter, for agricultural machines like plows, planters and the like. More particularly, the invention is related to the configuration and mounting of the disc tools for assisting and improving the replacement, restoration and repairing of the same when is necessary.

While a particular reference will be made in this specification to a colter or plowing disc, it is to be remarked that the concepts of the invention may be applied to any other working tool that needs to be rotatably mounted onto a shaft, preferably for freely rotation on the shaft.

2. Description of the Prior Art

It is well known to provide working disc tools, such as colters or plow discs that are stationary or rotatably mounted on corresponding shafts, which shafts are in turn mounted in a frame or machine. These kind of discs comprise a disc member and a cast iron hub that is affixed to the disc member by means of riveting, bolting or welding, for example. The hub forms a cavity for receiving a ball bearing previously tightly fixed onto a shaft. Then a nut is threadably connected to the shaft to retain the assembly in the hub.

In order that the hub is able to be affixed to the disc, the hub must be previously processed by a series of machining steps with the purpose of appropriately centering the hub in the disc, this centering of the hub, and hence of the bearing, being essential to prevent the disc from excentrically rotating what would result in a premature blunt of the disc cutting edge and even in the braking of the disc.

Due to the high number of components in these tools and the number of machining steps necessary to place them in proper conditions to work, the final cost of each disc assembly is very high. Considering that a planting or plowing machine comprises a plurality of such discs this cost is an important part of the machine cost, as well as in the costs of maintenance and service required by the disc tools. The time required for the servicing of these discs is excessive in such an extent that when a disc is damaged the user opts for directly replacing the same by a fresh one. It is common that a disc results damaged and unable to service during the working in the country, perhaps far from a servicing store, thus a number of tools must be carried in the planting or plowing machine for repairing or removing the disable disc.

In the event the machine operator has no proper tools to repair the damaged disc or discs the entire machine may become disable and the soil working must be interrupted to move the machine to a repairing site in the country or farm. If the disc is of the type having the hub riveted to the disc, the only way to replace the disc or the bearing is by cutting the rivets with a hammer and chisel. This action, however, may be dangerous to the integrity of the disc which may result broken or damaged by the hammering. Even when the hub and the bearing are satisfactorily removed from the disc member, the disc should be replaced by a fresh one because the orifices for the rivets in former disc generally result deformed and oversized because of the chiseling and hammering actions to remove the old rivets.

It would be therefore desirable to have a tool such as a plow disc, a colter and the like, made simple, with few and simple components, with removable fasteners for mounting the disc in the machine, and requiring simple and cheaper servicing.

SUMMARY OF THE INVENTION

It is therefore one object of the present invention to provide a tool for working the soil in agricultural labors such as tilling, cultivating, cutting, chopping haulm and soil, fertilizing works, closing and opening furrows, and the like, the tool comprising a metallic disc member having a center portion thereof shaped into a housing integrally forming one piece with the disc member, the housing having an inner wall forming fit mounting means for tightly receiving a bearing, such as a ball or needle bearing. Preferably the housing comprises a tubular portion formed in the disc member by stamping or by forging.

It is another object of the invention to provide a tool for working the soil in agricultural labors such as tilling, cultivating, cutting, chopping the haulm and soil, closing furrows, and the like, the tool comprising a metal disc member having a housing defined by a tubular portion projecting from the disc member and having mounting means comprising a first opening at one side of the disc member and a second opening at an opposite side of the disc member, the first opening having a first diameter for receiving a bearing and the second opening having a second diameter smaller than the first diameter to prevent the bearing to pass through the second opening. The tubular portion and the disc member comprises only one piece and the tubular portion is preferably formed by stamping or forging.

It is a further object of the present invention to provide a tool for working the soil in agricultural labors such as tilling, cultivating, cutting, chopping the haulm and soil, closing furrows, the tool comprising a metal disc member having a center portion thereof shaped into a housing integrally forming one piece with the disc member, the housing having an inner wall forming fit mounting means for tightly receiving a bearing, a bearing tightly received into the housing, a washer affixed to the disc member and retaining the bearing into the housing, a shaft having an end with a seat portion and a threaded portion, the bearing being tightly fit in the seat portion of the shaft, a nut threadably fixed onto the threaded portion thus retaining the bearing and the shaft together, and a dust cap provided over the nut to prevent dust from enter the threads of the nut and shaft.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
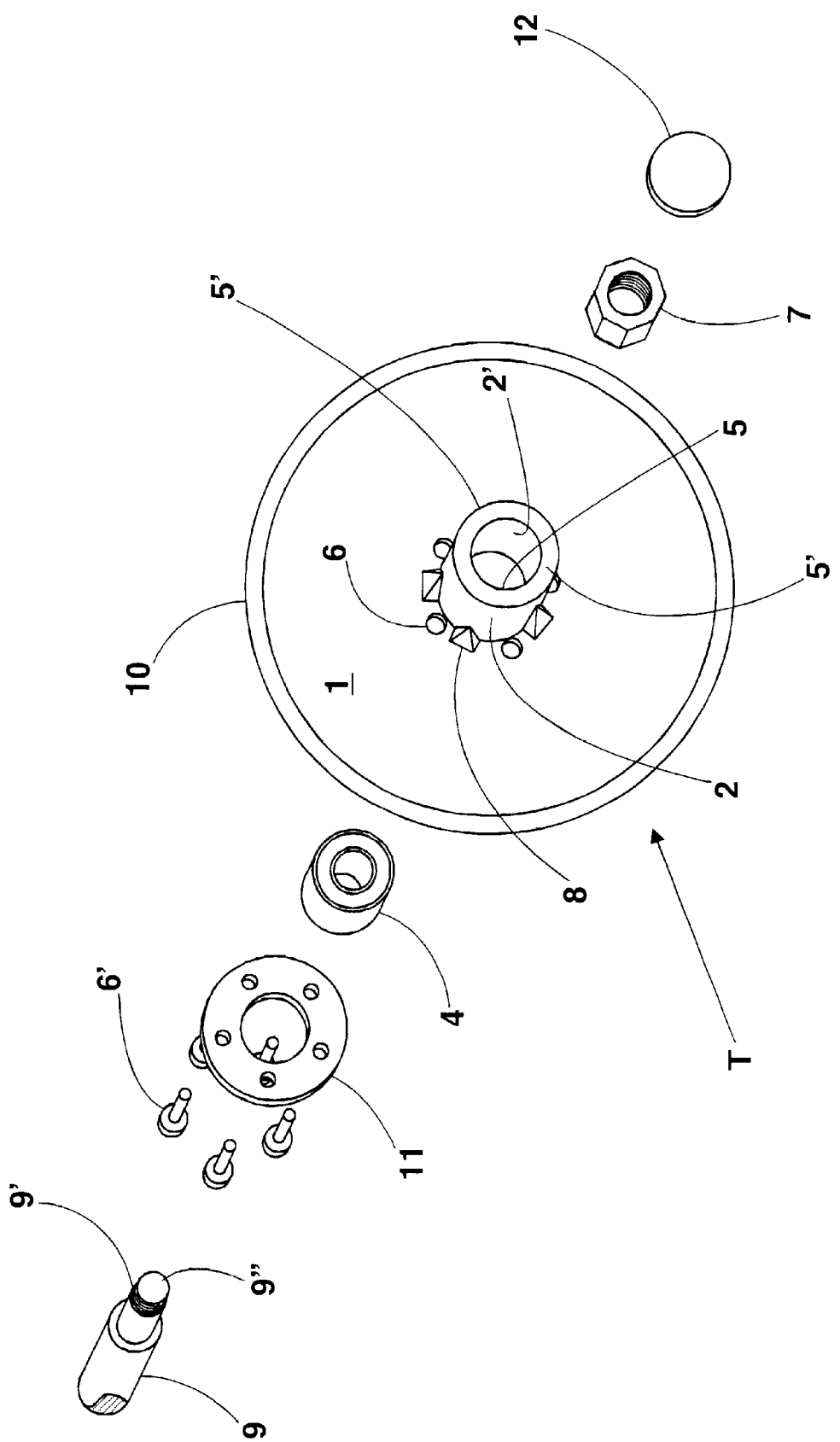
FIG. 1 shows a perspective, exploded view of a tool according to the invention.
Figure 2:
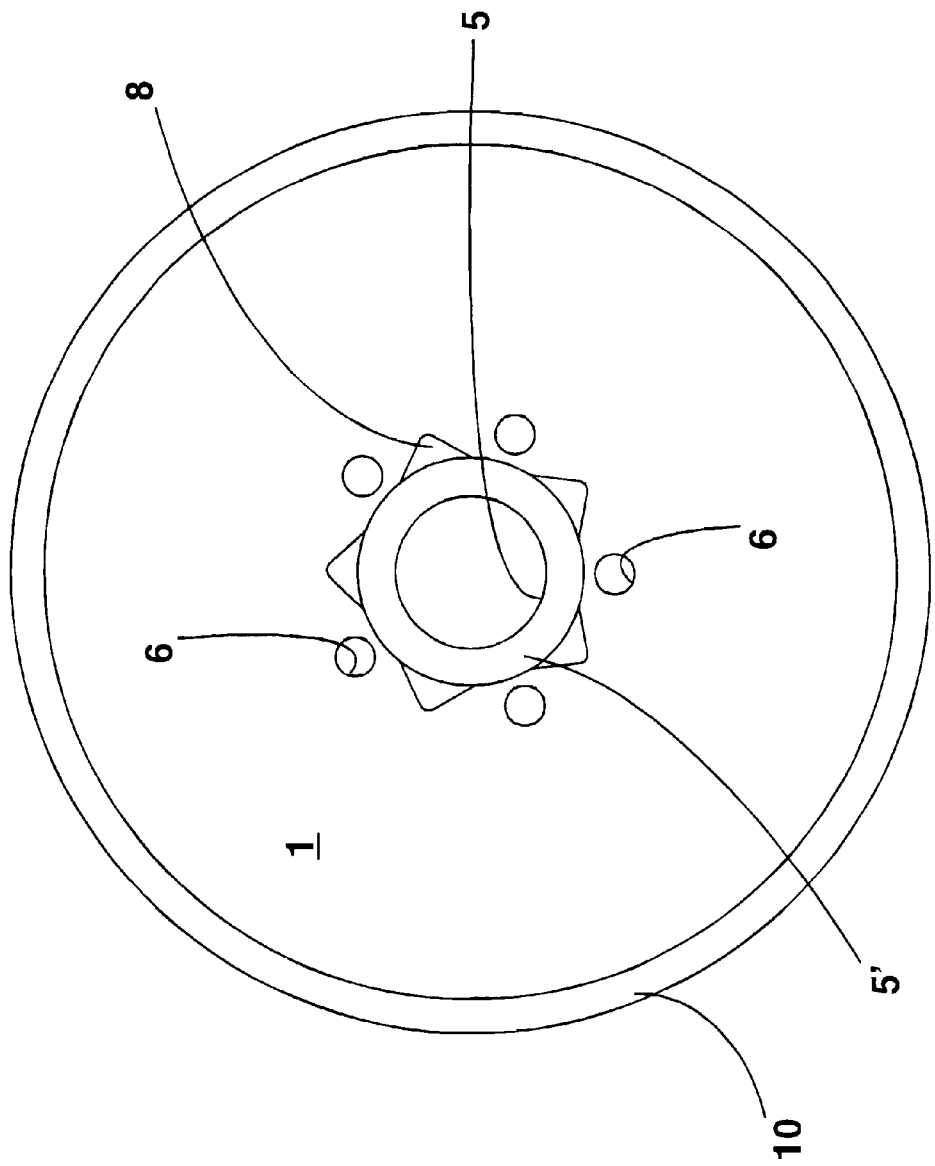
FIG. 2 shows a side elevational view of the disc of the invention, showing the disc member and the tubular portion without other components for clarity purposes.

Now referring in detail to the drawings it may be seen from FIGS. 1–4 that the inventive tool is a disc-shaped tool, preferably a colter disc, or a disc for tilling, cutting or chopping the harvest litter (haulm), for opening or closing furrows, for applying fertilizers, etc. The disc-shaped tool may also be a flat disc, a convex disc or concave disc, a fluted disc or coulters, deep fluted coulters, a rippled disc, solid or notches coulters or discs, with the cutting edge being continuous, sharpened or not, with peripheral teeth, nothces or cuts to grip and cut the haulm, etc.

The tool of the invention indicated by general reference T comprises a disc member 1 having a periphery defining a cutting edge 10 and having at a center portion of the disc a tubular portion 2 defining a housing with an inner wall 2' forming fit mounting means for tightly receiving a bearing 4. According to the invention, the center portion of disc 1 is shaped, by any cold-deforming or machining procedure, by stamping or forging for example, into the housing and the tubular portion, this tubular portion integrally forming one piece with the disc member.

Figure 3:
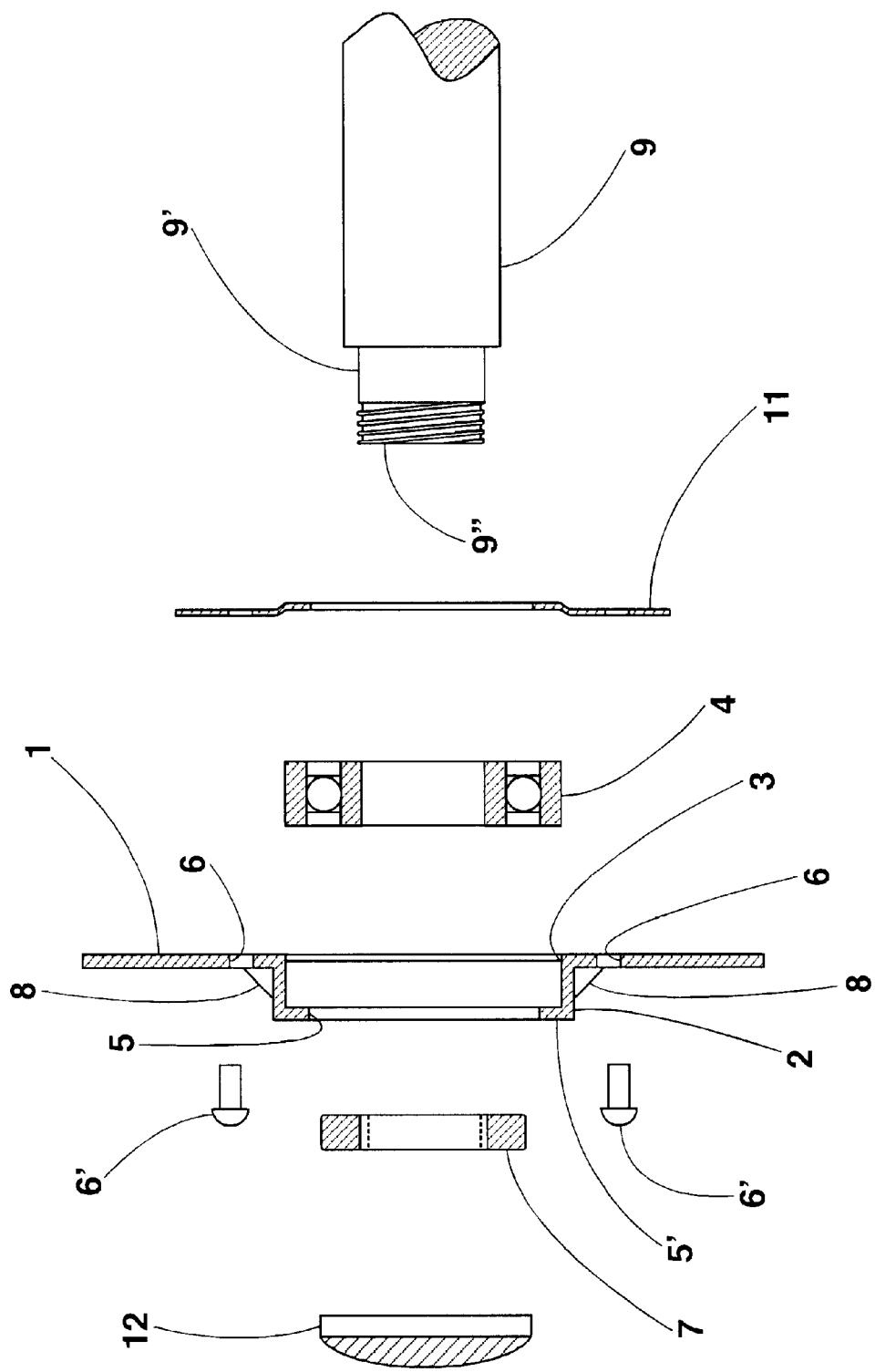
FIG. 3 shows an elevational, partially cross-sectional and exploded view of the tool of FIG. 1.

As it is better shown on FIG. 3, tubular portion 2 projects from the disc member and the mounting means of the housing comprise a first opening 3 at one side of the disc member and a second opening 5 at an opposite side of the disc member. First opening 3 has a first diameter for receiving bearing 4 and second opening 5 has a second diameter smaller than the first diameter to prevent the bearing to pass through the second opening. Preferably, the smaller diameter of second opening 5 is defined by a radially inwardly extending flange 5' defining a seat for the bearing. In addition, wall 2' of the housing defines an inner diameter that is slightly smaller than the outer diameter of bearing 4. Bearing 4 may be any kind of suitable bearing, such as a ball bearing, a needle bearing, etc. While tubular portion 2 and disc 1 are only one piece, additional structural resistance is provided by a plurality of reinforcing ribs 8 that are arranged at the junction between the tubular portion and the disc member.

Figure 4:
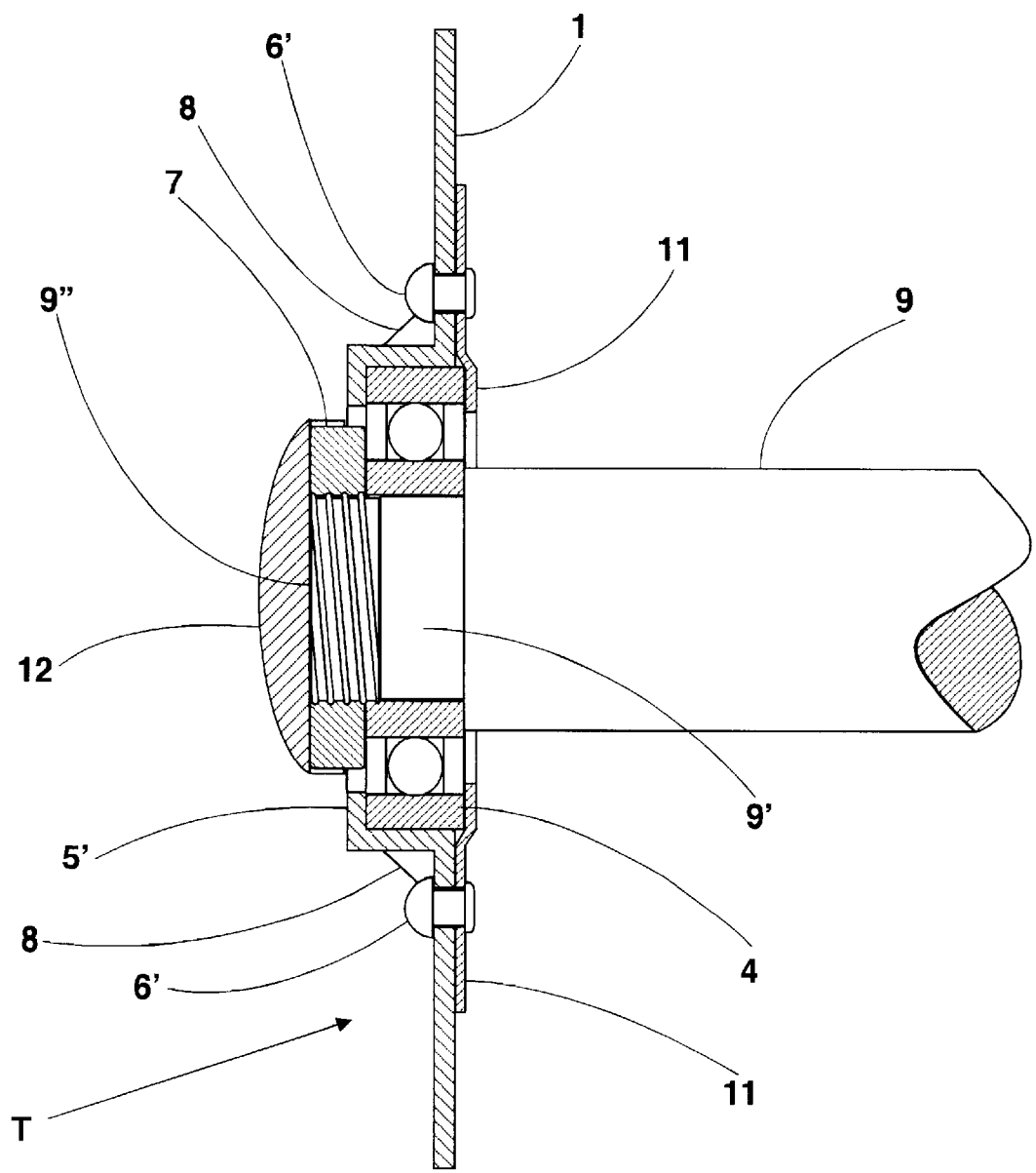
FIG. 4 shows a partially cross-sectional view of the tool of FIG. 3, with the components assembled.

As it is clearly shown in FIGS. 3, 4, bearing 4 is tightly received within tubular portion 2 and is retained by a diameter interference with inner wall 2' and flange 5'. In addition, a washer 11 is affixed to the disc member for assisting in retaining the bearing into the housing. A plurality of orifices 6 is arranged in the disc member, around the tubular portion, and washer 11 is affixed to the disc member by fasteners such as rivets 6' passing through the orifices.

To insert the bearing into the housing it is not necessary the use of an hydraulic press but it only may be helpful to apply an adhesive to the outer track of the bearing and insert the bearing into the housing. This adhesive is very well known for any person skilled in the art and it will retain the bearing within the housing while the entire tool arrangement is assembled. The bearing may be inserted into the housing by means of slight hammering, preferably using a piece of wood over the bearing in order to avoid hammering directly on the bearing. Once partially into the housing, stronger hammer-blows are necessary to make the bearing seat against flange 5'. Once the bearing is entirely mounted into tubular portion 2 washer 11 is assembled and affixed against the disc by providing rivets 6' through orifices 6 and riveting the same.

All the above arrangement is able to rotate about a desired axis of the agricultural machine by means of a shaft 9. Shaft 9 may be connected to a desired part of the machine depending of the work on which the toll is being applied. Shaft 9 has an end including a seat portion 9' and a threaded portion 9", the bearing being tightly fit in seat portion 9' and a nut 7 is threadably fixed onto the threaded portion of the shaft to retain the bearing and the shaft together. In order to prevent dust and particulate material enter the threaded connection between the nut, a dust cap 12 is provided over the nut.

In the event the tool is damaged during working in the country, the operator may easily remove the tool form the machine by unscrewing nut 12 in order to get the disc free of shaft 9. Thus, the arrangement comprising disc 1, bearing 4 and washer 11, still riveted to disc 1, may be easily removed and an identical arrangement comprising a fresh disc 1, bearing 4 and washer 11, may be immediately replaced in the machine thus not interrupting the soil laboring. The disable tool arrangement may be then carried to a repairing site in the country.

As it is apparent from the above description, the inventive disc and tool differs from the prior art discs in that the cost of manufacturing the present tool is lower because, among other causes, the stamping is made by a die may be provided with the configuration of the bearing to be received in the housing, thus avoiding the machining steps necessary for the hub in the conventional discs.

The concepts of the invention may be provided to any kind of discs, thus the stamping may be performed onto discs members having a concave, convex or flat configuration. The discs may have a continuous cutting edge or may be provided with teeth, projections or cuts in the periphery of the cutting edge. In addition, the disc may be of the fluted or rippled type, with radial waves or ripples.

It is also to be remarked that the services of the agricultural machines provided with the inventive tool, either periodical services or emergency services, may be performed in shorter periods of time as compared to the tools of the prior art. The tool of the present invention may be easily and quickly replaced by a fresh one without the need of special tools, hammers or chisels, and the components of the disc tool are not affected with the removal of the disc tool from the machine.

Since the disc tool is easily and rapidly removed and replaced an agricultural machine may carry extra disc tools to facilitate the replacement during the working in the country. The removed disc tool may be then repaired at the machine shop by simply disassembling the tool components and replacing those that have been damaged and disabled.

While preferred embodiments of the present invention have been illustrated and described, it will be obvious to those skilled in the art that various changes and modifications may be made therein without departing from the scope of the invention as defined in the appended claims.

I claim:

1. A tool for working the soil in agricultural labors, the tool comprising:

a metal disc member having a center portion thereof shaped into a housing integrally forming one piece with the disc member, the housing having an inner wall forming fit mounting means for tightly receiving a bearing, a bearing tightly received into the housing, a washer affixed to the disc member and retaining the bearing into the housing, and a plurality of orifices arranged in the disc member, around the housing, with the washer being affixed to the disc member by fasteners passing through the orifices.

2. The tool of claim 1, wherein the housing is formed in the disc member by stamping.

3. The tool of claim 1, wherein the housing is formed in the disc member by forging.

4. The tool of claim 1, wherein the housing forms a tubular portion projecting from the disc member and the mounting means of the housing forming the tubular portion comprise a first opening at one side of the disc member and a second opening at an opposite side of the disc member, the first opening having a first diameter for receiving the bearing and the second opening having a second diameter smaller than the first diameter to prevent the bearing to pass through the second opening.

5. The tool of claim 4, wherein the second opening has a radially inwardly extending flange defining a seat for the bearing.

6. The tool of claim 1, wherein the housing has an inner diameter smaller than an outer diameter of the bearing to be received into the housing.

7. The tool of claim 1, wherein the housing defines a tubular portion projecting from one side of the disc member, and a plurality of reinforcing ribs being provided at the junction between the tubular portion and said one side of the disc member.

8. The tool of claim 1, further comprising a shaft having an end with a seat portion and a threaded portion, the bearing being tightly fit in the seat portion of the shaft and a nut is threadably fixed onto the threaded portion thus retaining the bearing and the shaft together, a dust cap being provided over the nut to prevent dust from entering the threads of the nut and shaft.

9. The tool of claim 8, wherein the housing defines a tubular portion projecting from one side of the disc member, and a plurality of reinforcing ribs being provided at the junction between the tubular portion and said one side of the disc member.

10. A tool for working the soil in agricultural labors, the tool comprising:
- a disc member having a center portion thereof shaped into a housing integrally forming one piece with the disc member, the housing having an inner wall forming fit mounting means for tightly receiving a bearing,
- a bearing tightly received into the housing,
- a washer affixed to the disc member and retaining the bearing into the housing,
- a shaft having an end with a seat portion and a threaded portion, the bearing being tightly fit in the seat portion of the shaft,
- a nut threadably fixed onto the threaded portion thus retaining the bearing and the shaft together, and
- a dust cap provided over the nut to prevent dust from enter the threads of the nut and shaft.

11. A tool for working the soil in agricultural labors, the tool comprising:
- a metal disc member having a center portion thereof shaped into a housing-integrally forming one piece with the disc member, the housing having an inner wall forming fit mounting means for tightly receiving a bearing, the housing defining a tubular portion projecting from one side of the disc member, and a plurality of reinforcing ribs being provided at the junction between the tubular portion and said one side of the disc member.

12. The tool of claim 11, wherein the housing is formed in the disc member by stamping.

13. The tool of claim 11, wherein the housing forms a tubular portion projecting from the disc member and the mounting means of the housing forming the tubular portion comprises a first opening at one side of the disc member and a second opening at an opposite side of the disc member, the first opening having a first diameter for receiving the bearing and the second opening having a second diameter smaller than the first diameter to prevent the bearing from passing through the second opening.

14. The tool of claim 13, wherein the second opening has a radially inwardly extending flange defining a seat for the bearing.

15. The tool of claim 11, wherein the housing has an inner diameter smaller than an outer diameter of the bearing to be received into the housing.

16. The tool of claim 11, further comprising:
- a bearing tightly received into the housing and
- a washer affixed to the disc member and retaining the bearing into the housing.

17. The tool of claim 16, wherein a plurality of orifices are arranged in the disc member, around the housing, and the washer is affixed to the disc member by fasteners passing through the orifices.

18. The tool of claim 16, further comprising a shaft having an end with a seat portion and a threaded portion, the bearing being tightly fit in the seat portion of the shaft and a nut is threadably, fixed onto the threaded portion thus retaining the bearing and the shaft together, a dust cap being provided over the nut to prevent dust from entering the threads of the nut and shaft.

* * * * *